May 31, 1927.　　　　　　　　　　　　　　　　1,630,375
R. S. CURLEY
COTTON DISTRIBUTING MECHANISM
Filed June 6, 1925　　　　2 Sheets-Sheet 1
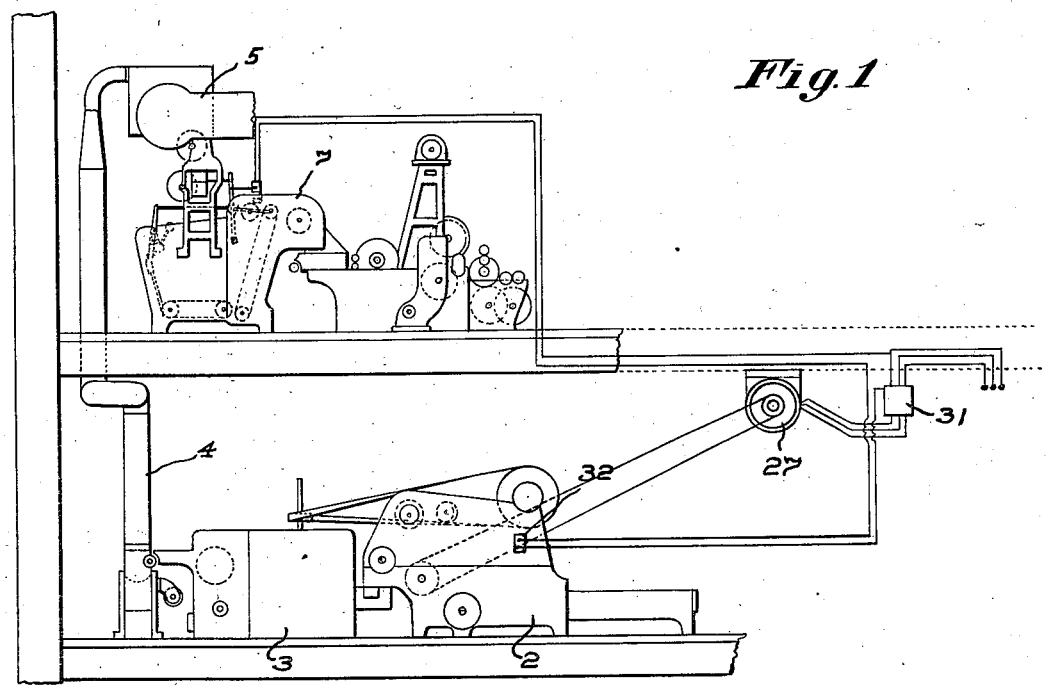
Fig.1
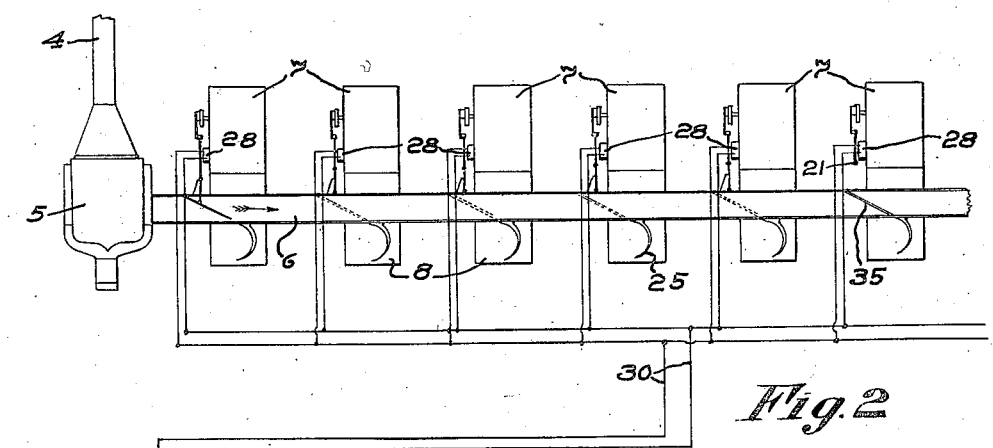
Fig.2
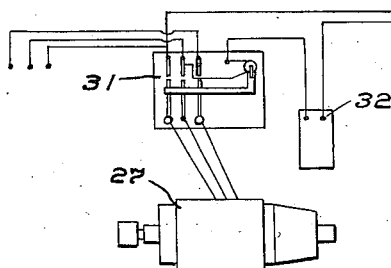
INVENTOR
Robert S. Curley
BY
ATTORNEY May 31, 1927.
R. S. CURLEY
1,630,375
COTTON DISTRIBUTING MECHANISM
Filed June 6, 1925
2 Sheets-Sheet 2
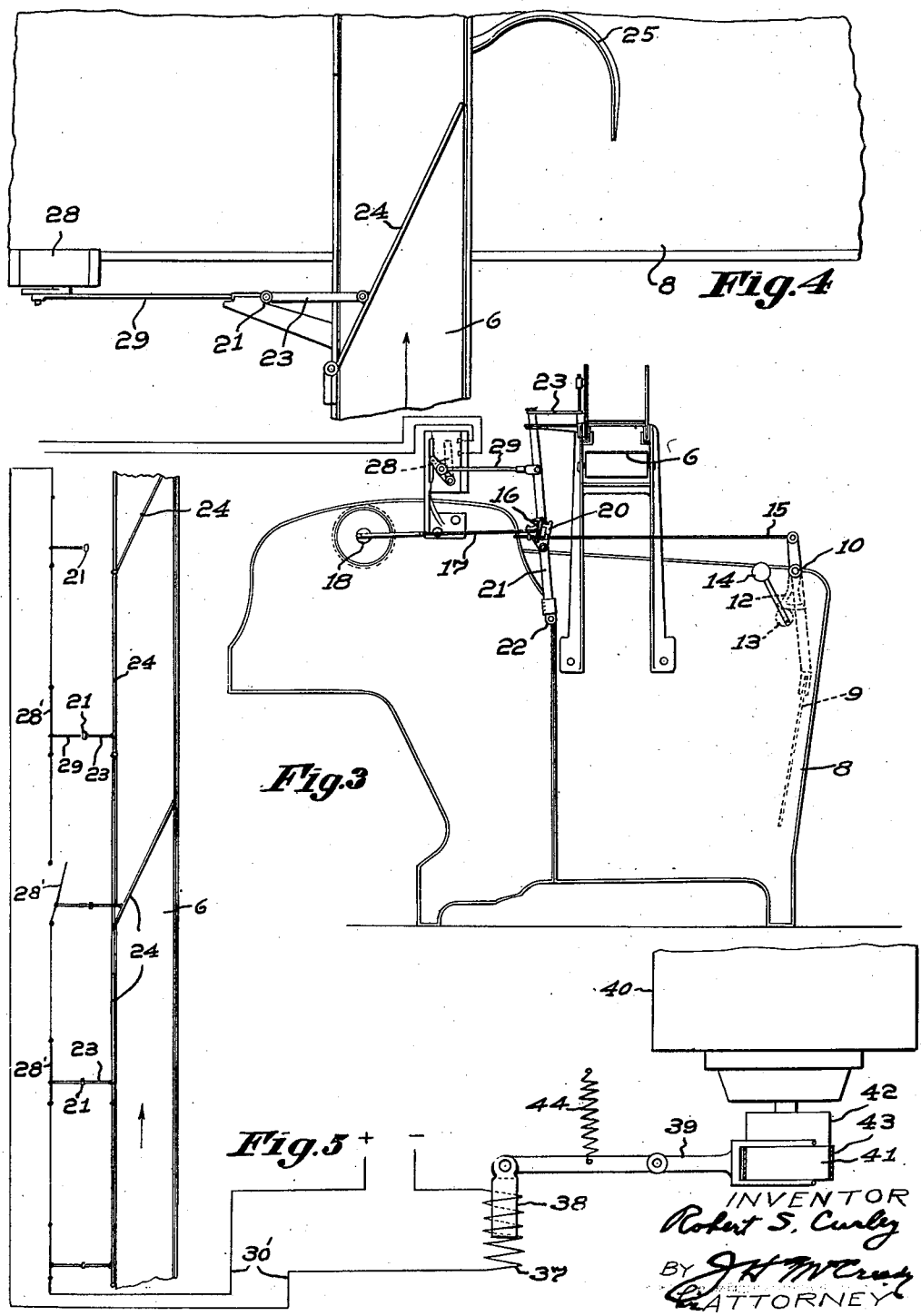

Patented May 31, 1927.

1,630,375

UNITED STATES PATENT OFFICE.

ROBERT S. CURLEY, OF LOWELL, MASSACHUSETTS, ASSIGNOR, BY MESNE ASSIGNMENTS, TO KITSON MACHINE SHOP, A CORPORATION OF MASSACHUSETTS.

COTTON-DISTRIBUTING MECHANISM.

Application filed June 6, 1925. Serial No. 35,382.

Cotton is delivered to a cotton mill in large bales and the first step in the preparation of this cotton for spinning consists in opening these bales and throwing the cotton into a machine known as a "bale breaker". The cotton at this time is in compact masses or wads and the bale breaker includes a beater which breaks up the compressed wads of cotton, loosens the fibre to some extent, and removes some of the dirt and foreign materials from the cotton. Usually the cotton is discharged directly from the bale breaker into an opener which further loosens up the fibre, and effects an additional separation of the fibre from dirt, sand, and the like, although such an opener is not always used at this point in the process. These machines are located in what is known as the "opening room", and the cotton is next conveyed pneumatically to the picker room where it is delivered to a belt conveyor. Usually a single conveyor feeds a series of pickers, and the distribution of cotton to the feed hoppers of the individual pickers is controlled automatically by a mechanism known as a Morton distributor. It may happen, however, that the conveyor will deliver cotton more rapidly than it is required by the pickers, since the distributing mechanism will permit the discharge of cotton from the conveyor to the machine hoppers only as it is required by the individual machines. When all the machines are supplied, therefore, the conveyor will still keep on discharging cotton and such cotton is dumped on the floor of the picker room.

It is the chief object of the present invention to improve cotton distributing mechanisms with a view to rendering them more completely automatic and more especially to preventing an occurrence of the character just described.

The nature of the invention will be readily understood from the following description when read in connection with the accompanying drawings, and the novel features will be particularly pointed out in the appended claims.

Referring now to the drawings,

Figure 1 is a diagrammatic elevation of an apparatus embodying some features of the present invention;

Fig. 2 is a diagrammatic plan view of certain parts of the apparatus shown in Fig. 1;

Fig. 3 is a side elevation of a hopper for a cotton picker equipped with a Morton distributor;

Fig. 4 is a plan view of the conveyor, gate, and associated parts of the mechanism shown in Fig. 3; and Fig. 5 is a diagrammatic view showing another embodiment of the invention.

Referring first to Figs. 1 and 2, the apparatus there shown comprises a bale breaker 2 of a common type arranged to discharge the cotton fed through it into a vertical opener 3 which also is of a common construction. The opener delivers cotton to the intake end of a wind trunk or pneumatic conveyor 4 which carries the cotton to a condenser 5 located in the picker room. The condenser deposits the cotton on a horizontal conveyor belt 6 which supplies a series of cotton working machines indicated at 7. These machines may be of any one of a variety of types.

A typical construction of feed hopper and associated mechanism is shown in Figs. 3 and 4. The hopper 8 is equipped with a feeler fork 9 which is secured on a rock shaft 10, and a gear sector 12 also mounted on this rock shaft meshes with a pinion 13 to which a weighted arm 14 is fastened. The weight 14 thus tends to swing the feeler 9 forward toward the central part of the hopper 8. A rod 15 connects the upper end of the feeler fork lever with a rocker 16 which is arranged to engage a sector 20 that is oscillated by a pitman rod 17 driven from the shaft 18. So long as an ample supply of cotton remains in the hopper 8, the rocker 16 will remain in the position in which it appears in Fig. 3; but when the supply of cotton becomes depleted the feeler fork 9 will be swung forward, or toward the left, Fig. 3, thus operating through the rod 15 to tip the rocker 16 into the reverse position to that shown and thereby causing this rocker to engage the left-hand ear of the sector 20. This causes the sector to swing the rocker toward the right. The sector is pivoted on a lever 21 and this movement swings the lever on its pivot 22. The upper end of this lever is connected by a link 23 to a gate 24 that is movable backward and forward across the upper surface of the belt 6. When the movement just described takes place the gate 24 is swung into the position shown in Fig. 4 where it operates to divert cotton carried by the belt 6 into the hopper 8. A guard 25 catches the cotton and guides it downwardly into the hopper.

When the supply of cotton in the hopper has become replenished the weight of the cotton pushes the feeler fork 9 backwardly into its original position, thus operating through the rod 15 to tip the rocker 16 back into the position shown in Fig. 3. The rocker then engages the right-hand ear of the sector 20 which results in swinging the lever 21 back to the left and thus moves the gate 24 into a position where it lies at one side of, and parallel with, the belt 6. This is the inoperative position of the gate.

Each of the pickers or cotton working machines 7 is equipped with a mechanism like that shown in Figs. 3 and 4, as will be evident from an inspection of Fig. 2. This is a typical Morton distributor installation.

It will be observed that the bale breaker 2, opener 3, pneumatic conveyor 4, and conveyor belt 6 are operative to supply cotton to the entire series of machines 7, but that the delivery of cotton from this supplying means to the individual machines is effected by the gate 24 which is automatically operated by the apparatus above described.

It will also be observed that if all of the machines were supplied with cotton and all the gates 24 consequently were in their inoperative positions, the cotton supplying mechanism would still continue to operate, with the result that cotton would be discharged upon the floor at the end of the conveyor belt 6. The present invention provides means for automatically controlling the operation of the cotton supplying mechanism in accordance with the demands of the machines supplied.

In the arrangement shown the bale breaker 2 is driven by an electric motor 27, Figs. 1 and 2, and the cotton opener 3 is driven by belt connections with the bale breaker 2. It is contemplated that the blowers for the pneumatic conveyor will be operated continuously, but it is evident that if the motor 27 is stopped the delivery of cotton to the pneumatic conveyor will be automatically stopped, and consequently, the supply of cotton to the machine 7 will be interrupted. The mechanism shown in Figs. 1 and 2 includes an electric switch for each of the hoppers, and the switch for any hopper is arranged to be closed when the gate operating apparatus for that particular hopper moves the gate into its operative position across the belt. The closing of this switch energizes a control circuit for a main or master switch which controls the motor 27, so that so long as any machine in the series is calling for cotton, the motor 27 will be maintained in operation.

Referring to Fig. 3, the switch on the hopper 8 is shown at 28 and the switch is indicated as open. A link 29 connects this switch with the lever 21 so that when this lever moves the gate 24 into its operative position the switch 28 will be closed. When the gate is again returned to its inoperative position the switch will be opened. The switches for the hoppers are all connected in parallel across a control circuit 30, Fig. 2, which is arranged to operate a main or control switch 31 of the electro-magnetic type. This switch 31 includes a spring for opening it and an electro-magnet for closing it when the circuit through the magnetic coil is closed. Other switching apparatus of any convenient character may also be included, such, for example, as a starting and stopping push button switch 32 which is arranged to be manually operated for starting and stopping the motor 27 independently of the hopper switches.

It will now be evident that when this apparatus is in operation cotton will be supplied to the machines 7 in the usual manner so long as any machine is calling for cotton. As soon, however, as all the machines are supplied the control circuit 30 then will be opened, thus causing the switch 31 to open and thereby stop the motor 27. This shuts down the bale breaker 2 and opener 3 and thus interrupts the operation of the cotton supplying mechanism.

When this interruption occurs a certain amount of cotton will be in transit in the pneumatic conveyor 4 and on the belt 6. In order to prevent this cotton from being discharged on the floor of the picker room, the gate 35, Fig. 2, of the last machine in the series is disconnected from its operating lever 21 and is locked permanently in its operative position. Consequently, the cotton in transit at the time that the motor 27 is stopped will be discharged into the hopper of the last machine in the series.

After such an interruption has occurred, the motor 27 and the machines which it drives remain idle until the feeler mechanism for one of the machines 7 operates to call for cotton. This closes the switch of that particular hopper, thus energizing the control circuit 30 and starting up the motor 27 again. The bale breaker 2 and opener 3 are immediately brought into operation again and the apparatus thereupon resumes its normal delivery of cotton from the opening room to the picker room.

A somewhat different arrangement is shown diagrammatically in Fig. 5. In this construction the switches 28' are like the switches 28 except that the contacts are arranged on the opposite side of the movable switch element so that the switch is opened upon the movement of the gate 24 into its operative position and is closed when the gate is moved into its inoperative position again. All these switches are arranged in series in a control circuit 30'. This control circuit may be made to operate a master switch as in the arrangement shown in Figs. 1 and 3, but as shown in Fig. 5, it controls a circuit through a solenoid 37 arranged to act on a core 38 which is connected to one end of a belt shifter 39. A portion of the bale breaker is indicated in this figure at 40, and the main shaft carries fast and loose pulleys 41 and 42, respectively, to receive a driving belt 43. Normally a spring 44 acts through the shifter lever 39 to hold the belt 43 on the fast pulley 41 and thus to maintain the bale breaker in operation. This condition will obtain so long as any cotton working machine in the series is calling for cotton; but when all the machines are supplied, and consequently all the gates are moved into their inoperative positions, the control circuit 30' then will be closed since all the switches 28' then will be in their closed positions. This energizes the solenoid 37 and thus operates through the core 38 and shifter 39 to move the belt 43 on to the loose pulley 42. This operation shuts down the bale breaker and interrupts the delivery of cotton to the picker room in the manner above described. As soon as any machine calls for cotton again the switch 28' of that machine will be opened, thus breaking the control circuit 30, de-energizing the solenoid 37 and again permitting the spring 44 to operate through the shifter 39 to carry the belt on to the fast pulley. In this arrangement, as also in that above described, the gate 24 of the last machine in the series is disconnected from the feeler control apparatus which operates it so that this apparatus simply operates the switch for this hopper without operating the gate. Consequently, any cotton in transit when the bale breaker is shut down is delivered to the hopper of the last machine in the series instead of being dumped on the floor, as otherwise would occur.

This arrangement has the advantage over that above described that the control circuit normally is open, while in the arrangement shown in Figs. 1 and 2 the control circuit is closed most of the time. The apparatus shown in Fig. 5, therefore, is somewhat more economical to operate. It should be understood, however, that either circuit arrangement shown could be used to control either a driving motor, a belt shifter, or a small motor which would operate a belt shifter.

While I have herein shown and described the best embodiments of my invention that I have so far devised, it will be evident that the invention may be embodied in other forms without departing from the spirit or scope thereof. It will also be understood that while I have above described the apparatus particularly in connection with the distribution of cotton, the apparatus may also be used for distributing other fibre and that the term "cotton" is used in a generic sense to include other materials which can be handled by the apparatus.

Having thus described my invention, what I desire to claim as new is:

1. In a cotton distributing apparatus, the combination of a series of cotton working machines, mechanism for supplying cotton to the machines, devices for controlling the delivery of cotton from said supplying mechanism to the machines, and means whereby said devices control the operation of said supplying mechanism.

2. In a cotton distributing apparatus, the combination of a series of cotton working machines, mechanism for supplying cotton to the machines including a conveyor, devices for controlling the delivery of cotton from said conveyor to the machines in accordance with the requirements of the individual machines, and means whereby said devices automatically control the operation of said supplying mechanism.

3. In a cotton distributing apparatus, the combination of a series of cotton working machines, mechanism for supplying cotton to the machines, devices for controlling the delivery of cotton from said supplying mechanism to the machines, and automatic means under the control of said devices for maintaining said supplying mechanism in operation so long as any machine in the series is not sufficiently supplied with cotton, and for interrupting said operation substantially as soon as all of said machines are supplied.

4. In a cotton distributing apparatus, the combination of a series of cotton working machines, mechanism for supplying cotton to the machines, devices for controlling the delivery of cotton from said supplying mechanism to the machines, and electrical means under the control of said devices for automatically controlling the operation of said supplying mechanism in accordance with the demands of said machines.

5. In a cotton distributing apparatus, the combination of a series of cotton working machines, mechanism for supplying cotton to said machines including a conveyor, automatic apparatus operatively associated with each of said machines for controlling the delivery of cotton from said conveyor to the individual machines in accordance with their requirements, and means arranged to be operated by said apparatus for automatically controlling the operation of said supplying mechanism.

6. In a cotton distributing apparatus, the combination of a series of cotton working machines, mechanism for supplying cotton to said machines including a conveyor, automatic apparatus operatively associated with each of said machines for controlling the delivery of cotton from said conveyor to the individual machines in accordance with their requirements, electric switches arranged to be operated by said apparatus, and a control circuit for said mechanism controlled by said switches.

7. In a cotton distributing apparatus, the combination of a series of cotton working machines, mechanism for supplying cotton to the machines, said mechanism including driving means, automatic apparatus operatively associated with each of said machines for automatically controlling the delivery of cotton from said supplying mechanism to said machines in accordance with the requirements of the individual machines, a switch arranged to be operated by each apparatus, a control circuit in which said switches are included, and electro-magnetic means controlled by said circuit for throwing said driving mechanism into and out of operation.

8. In a cotton distributing system, the combination of a series of cotton working machines, cotton working apparatus located remotely from said machines, conveying mechanism for delivering cotton from said apparatus to said machines, devices for controlling the delivery of cotton from said conveying mechanism to said machines in accordance with the requirements of the individual machines, and means for enabling said devices to control automatically the operation of said apparatus.

9. In a cotton distributing apparatus, the combination of a series of cotton working machines, mechanism for supplying cotton to the machines, devices for automatically controlling the delivery of cotton from said supplying mechanism to said machines in accordance with the requirements of the individual machines, and means for automatically interrupting the operation of said supplying mechanism substantially as soon as all the machines in the series are supplied with cotton and for starting said mechanism into operation again when the supply of cotton in any one of said machines becomes depleted.

10. In a cotton distributing apparatus, the combination of a series of cotton working machines, mechanism for supplying cotton to said machines including a bale breaker and a conveyor for delivering cotton from said bale breaker to said cotton working machines, gates associated with said machines and arranged to be operated automatically to control the discharge of cotton from said conveyor to the individual machines in accordance with their requirements, and means for automatically stopping said bale breaker when said machines are supplied with cotton and starting it again when any machine in said series requires additional cotton.

ROBERT S. CURLEY.